(12) United States Patent
Yu et al.

(10) Patent No.: US 10,793,001 B2
(45) Date of Patent: Oct. 6, 2020

(54) TRANSMISSION AND DRIVE SYSTEM FOR AN ELECTRIC VEHICLE

(71) Applicant: Zhejiang Easy Vehicle Co., Ltd., Yongkang, Zhejiang Province (CN)

(72) Inventors: Sam Yu, Yongkang (CN); Yong Wen, Yongkang (CN)

(73) Assignee: ZHEJIANG EASY VEHICLE CO., LTD. (CN)

( * ) Notice: Subject to any disclaimer, the term of this patent is extended or adjusted under 35 U.S.C. 154(b) by 0 days.

(21) Appl. No.: 16/506,858

(22) Filed: Jul. 9, 2019

(65) Prior Publication Data

US 2019/0337382 A1 Nov. 7, 2019

Related U.S. Application Data

(63) Continuation-in-part of application No. 16/414,066, filed on May 16, 2019, now abandoned, which is a (Continued)

(30) Foreign Application Priority Data

Aug. 16, 2016 (CN) ..................... 2016 2 0889516 U

(51) Int. Cl.
*B60K 17/04* (2006.01)
*B62M 11/02* (2006.01)
(Continued)

(52) U.S. Cl.
CPC .......... *B60K 17/043* (2013.01); *B60K 7/0007* (2013.01); *B60K 17/14* (2013.01);
(Continued)

(58) Field of Classification Search
CPC .... B60K 17/043; B60K 17/14; B60K 7/0007; B60K 2007/0061; B62M 11/02;
(Continued)

(56) References Cited

U.S. PATENT DOCUMENTS 1,363,353 A   12/1920  Riker
4,493,677 A *  1/1985  Ikenoya ................... B62M 9/06
                                              474/150

(Continued)

*Primary Examiner* — Erez Gurari
(74) *Attorney, Agent, or Firm* — Morriss O'Bryant Compagni Cannon, PLLC

(57) ABSTRACT

A transmission and drive system comprises an input end connected to a driving device, an output end connected to a rear wheel, a gear transmission mechanism and a belt driven transmission mechanism. A unidirectional transmission mechanism is connected to the rear wheel with the unidirectional transmission mechanism driving the rear wheel. The transmission provides power output by the driving device, transmits power to the pulley transmission mechanism by the gear transmission mechanism, and the pulley transmission mechanism drives the rear wheel to rotate the unidirectional transmission mechanism, such that the vehicle moves forward. Noise dampening plates are provided to reduce noise emanating from the transmission. In addition, a belt tensioning system is provided to maintain consistent tension on the belt.

20 Claims, 15 Drawing Sheets

Related U.S. Application Data continuation of application No. 15/678,931, filed on Aug. 16, 2017, now abandoned.

(51) Int. Cl.
*B60K 17/14* (2006.01)
*B62M 9/02* (2006.01)
*B60K 7/00* (2006.01)
*F16H 7/02* (2006.01)
*F16H 7/08* (2006.01)

(52) U.S. Cl.
CPC .............. *B62M 9/02* (2013.01); *B62M 11/02* (2013.01); *F16H 7/023* (2013.01); *F16H 7/0848* (2013.01); *B60K 2007/0061* (2013.01); *B60Y 2200/91* (2013.01); *B62K 2202/00* (2013.01); *B62K 2204/00* (2013.01)

(58) Field of Classification Search
CPC ........ B62M 9/02; F16H 7/023; F16H 7/0848; F16H 7/1281; F16H 57/028; F16H 2057/02034; F16H 2057/02065; B62K 2204/00; B62K 2202/00; B60Y 2200/91; B60Y 2200/126

See application file for complete search history.

(56) References Cited

U.S. PATENT DOCUMENTS

| | | | | |
|---|---|---|---|---|
| 5,900,686 | A * | 5/1999 | Tabata | H02K 1/185 310/71 |
| 6,062,329 | A | 5/2000 | Chai | |
| 7,617,899 | B1 * | 11/2009 | Warner | B62M 27/02 180/190 |
| 9,937,975 | B2 | 4/2018 | Ragland et al. | |
| 2002/0070088 | A1 | 6/2002 | Hsu | |
| 2002/0117343 | A1 | 8/2002 | Kao | |
| 2003/0221888 | A1 | 12/2003 | McKinney, Jr. et al. | |
| 2004/0016582 | A1 * | 1/2004 | Ho | F02N 15/023 180/181 |
| 2010/0323834 | A1 * | 12/2010 | Grube | F16H 7/02 474/144 |
| 2013/0032425 | A1 * | 2/2013 | Lee | B62M 6/55 180/220 |
| 2013/0081894 | A1 * | 4/2013 | Ishikawa | B62M 7/04 180/220 |
| 2014/0346752 | A1 * | 11/2014 | Rasmussen | B62K 5/05 280/238 |
| 2015/0008059 | A1 | 1/2015 | Douglas et al. | |
| 2015/0045162 | A1 * | 2/2015 | Serkh | F16H 7/08 474/88 |
| 2015/0202919 | A1 | 7/2015 | Koshiyama | |
| 2015/0276025 | A1 * | 10/2015 | Grube | B62K 11/04 474/112 |
| 2016/0068223 | A1 * | 3/2016 | Zanfei | B60B 27/0068 301/6.5 |
| 2016/0075400 | A1 * | 3/2016 | Ragland | B62K 13/00 180/220 |
| 2016/0325802 | A1 * | 11/2016 | Leiber | C22B 25/06 |
| 2017/0144728 | A1 | 5/2017 | Silva | |
| 2017/0371331 | A1 * | 12/2017 | Cameron | B62B 5/0069 |
| 2018/0031078 | A1 | 2/2018 | Bell | |
| 2018/0037298 | A1 | 2/2018 | Su et al. | |
| 2018/0050760 | A1 * | 2/2018 | Ponder | B62M 6/20 |
| 2019/0070746 | A1 * | 3/2019 | Hanussek | F16H 7/02 |
| 2019/0316659 | A1 * | 10/2019 | Mariotti | B62M 7/06 |
| 2019/0333382 | A1 * | 11/2019 | Yu | F16H 57/028 |
| 2019/0345992 | A1 * | 11/2019 | Mariotti | F16D 23/12 |
| 2019/0367127 | A1 * | 12/2019 | Noda | B62M 6/80 |

\* cited by examiner

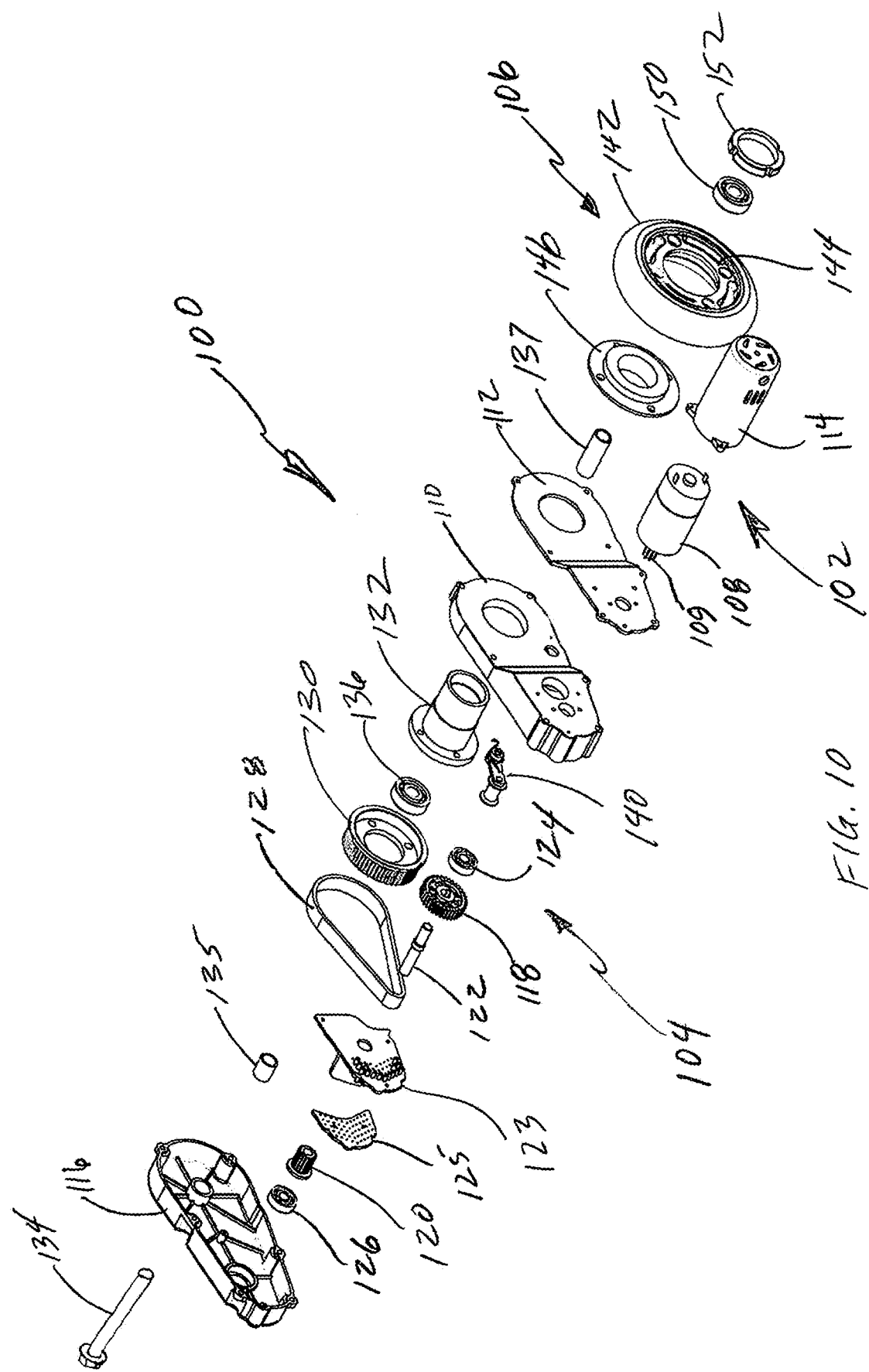

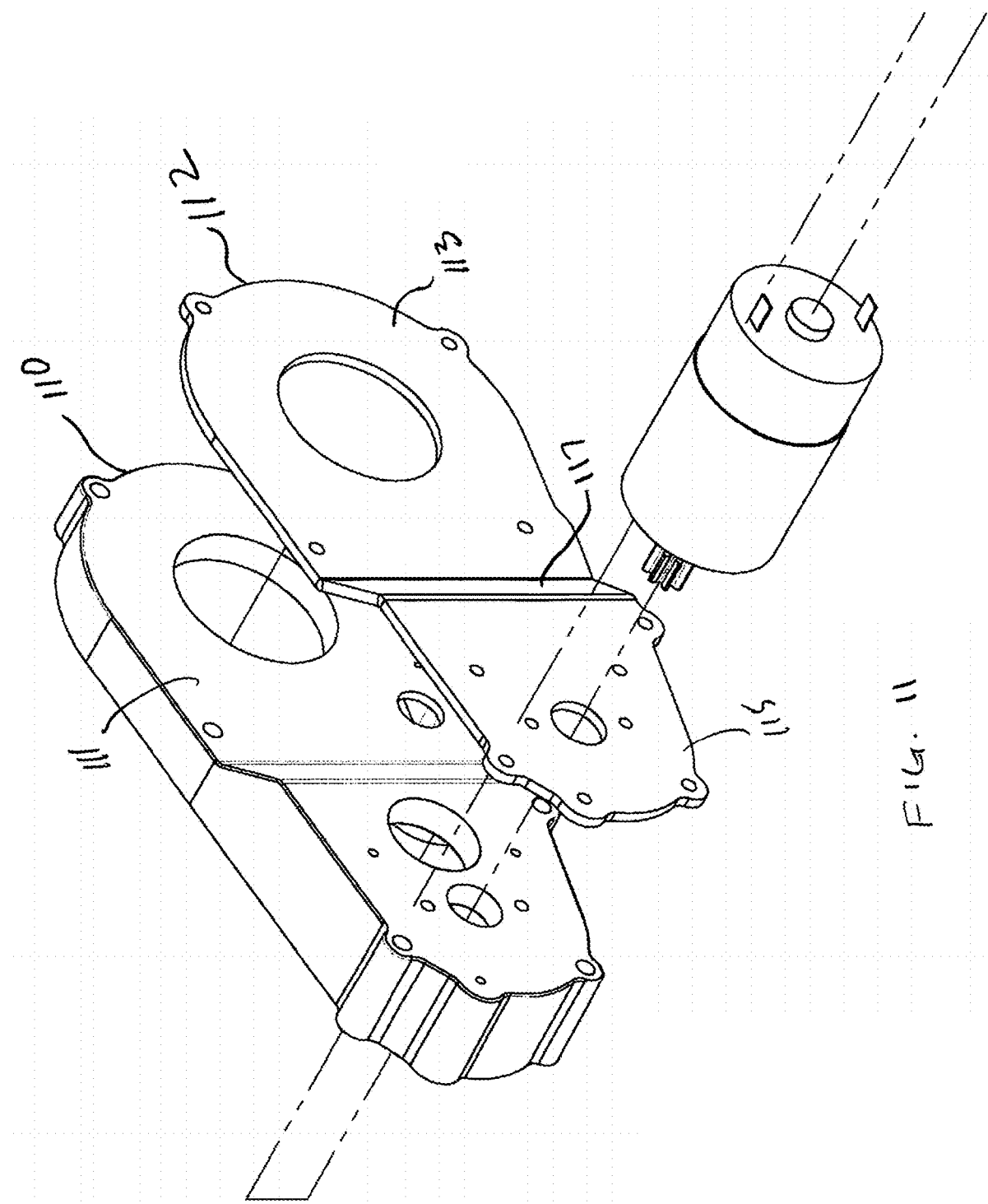

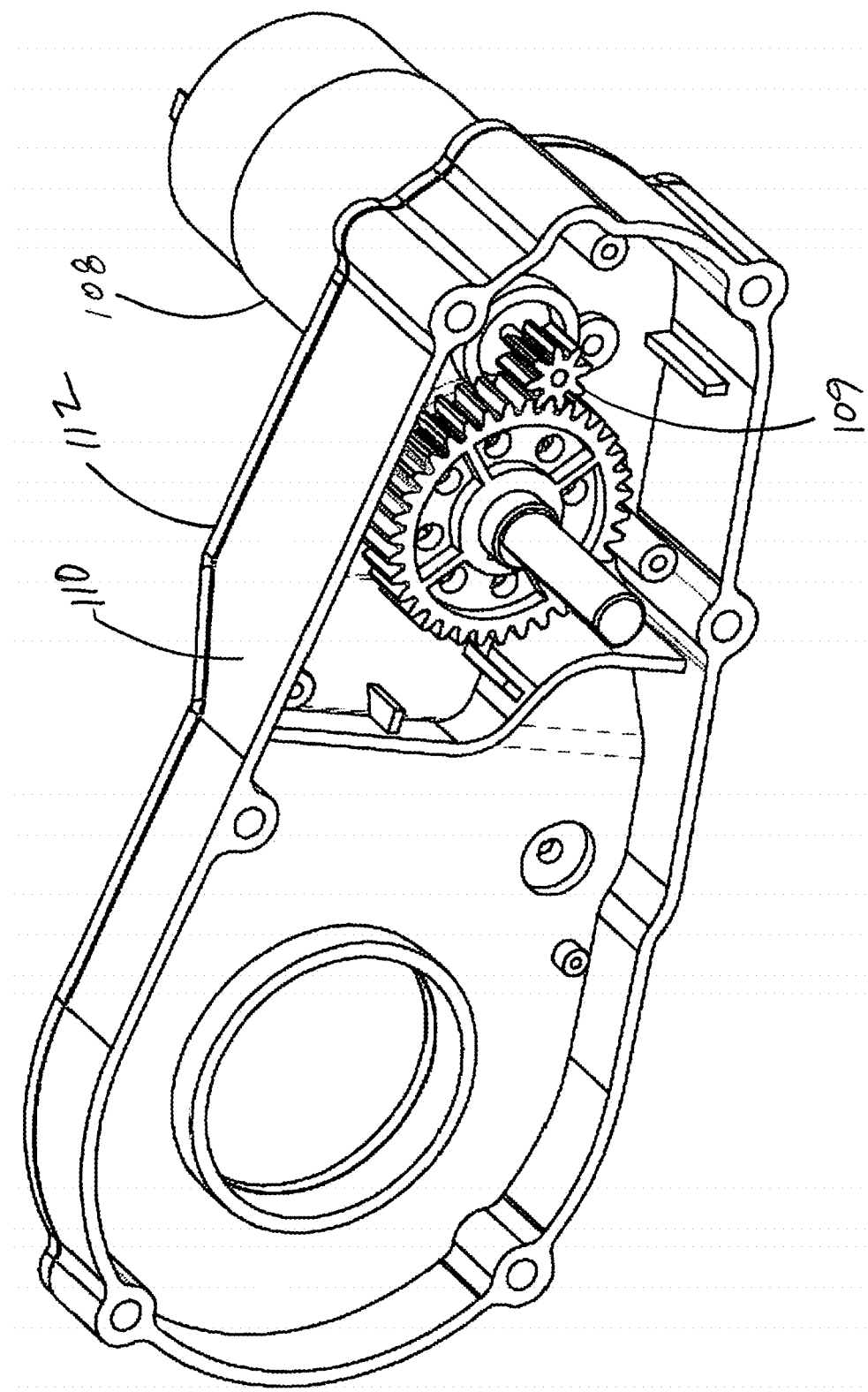

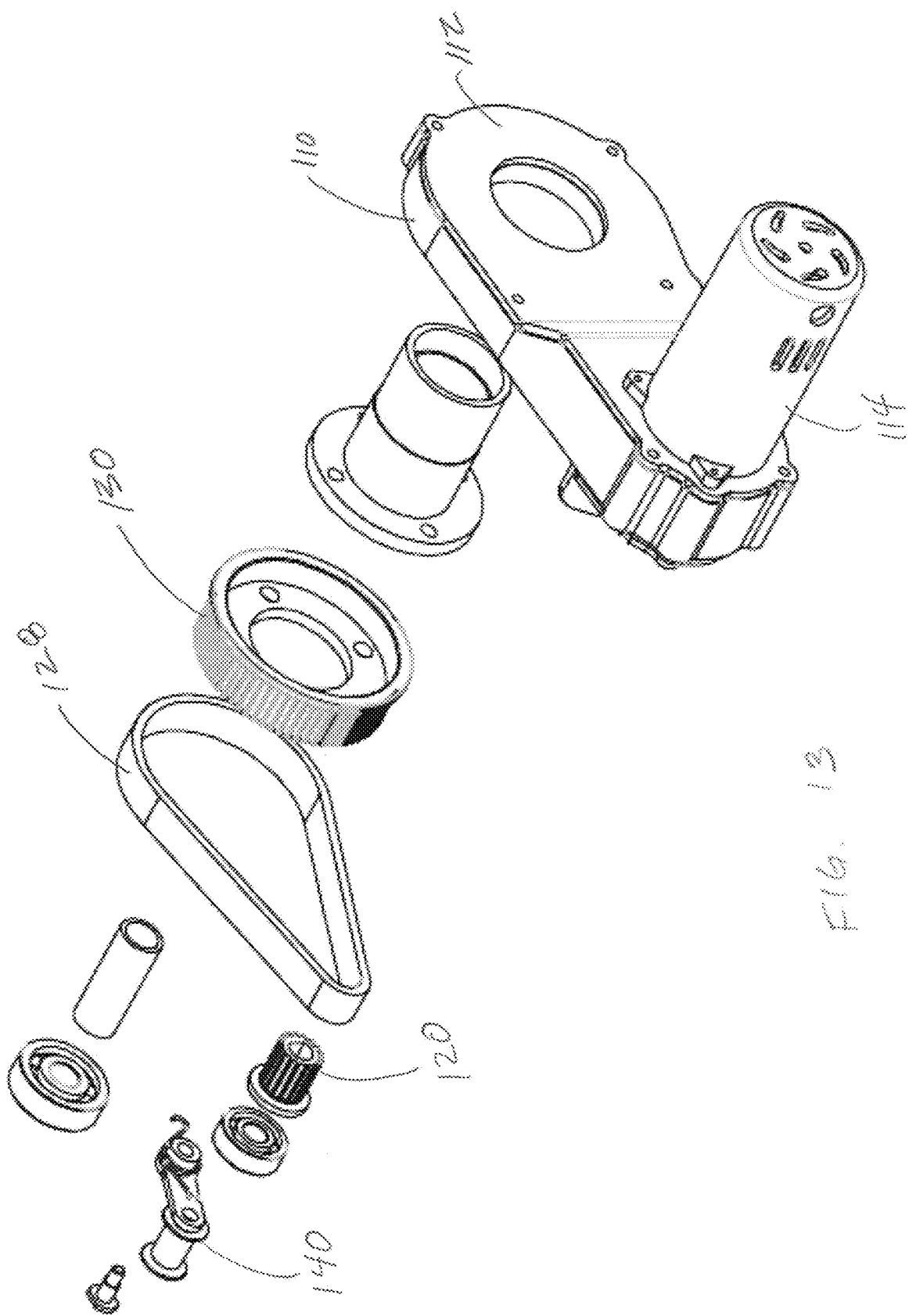

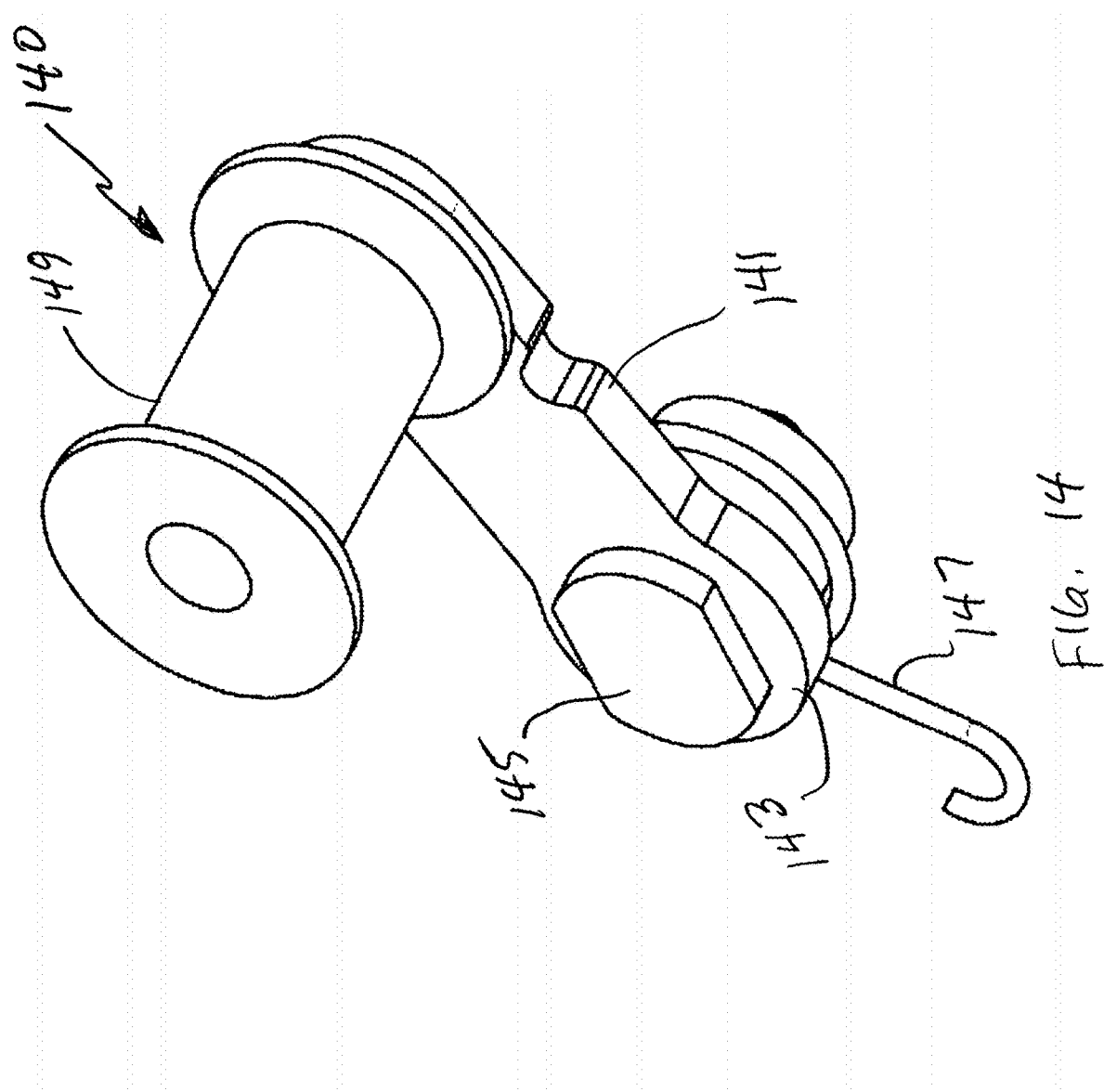

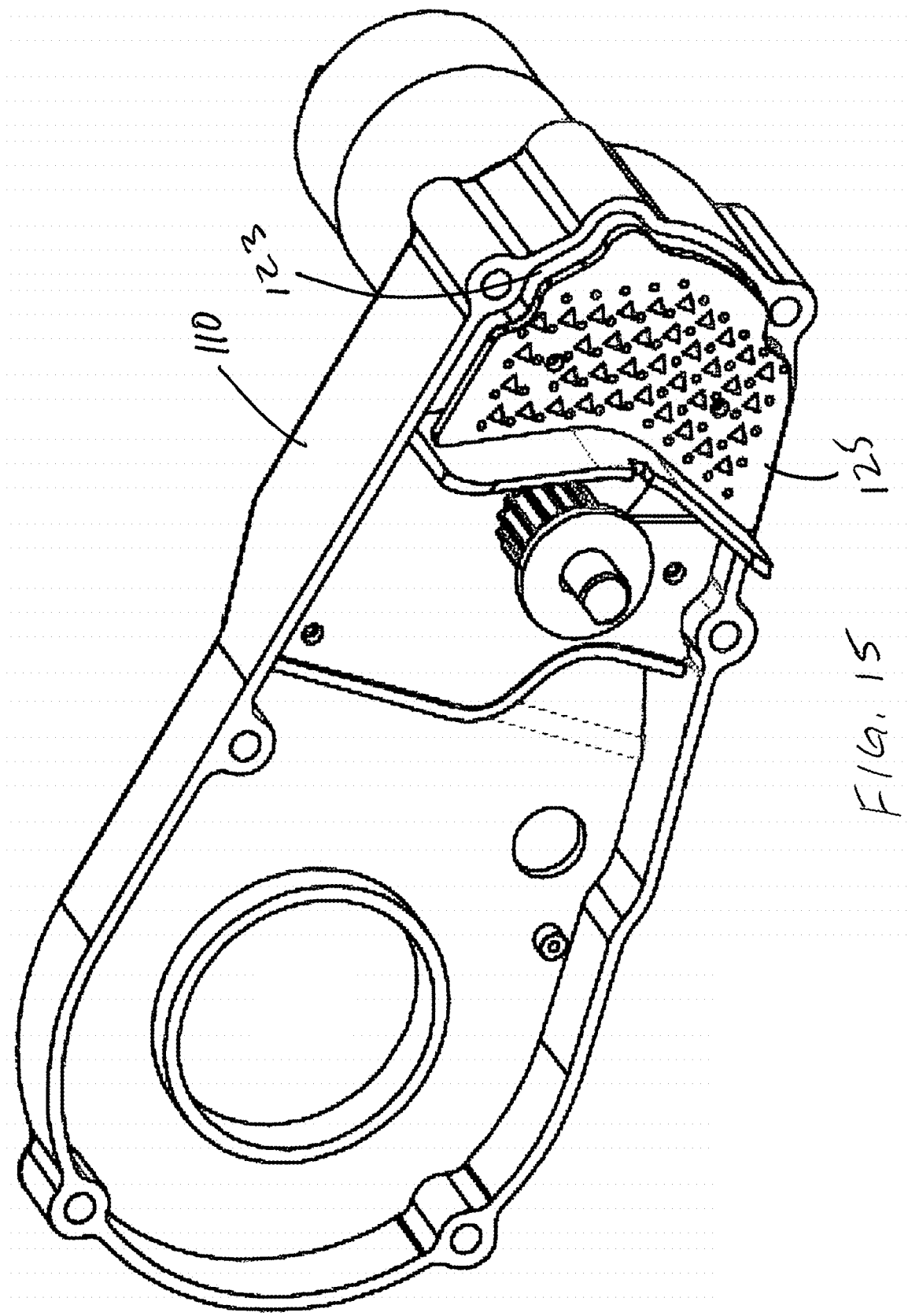

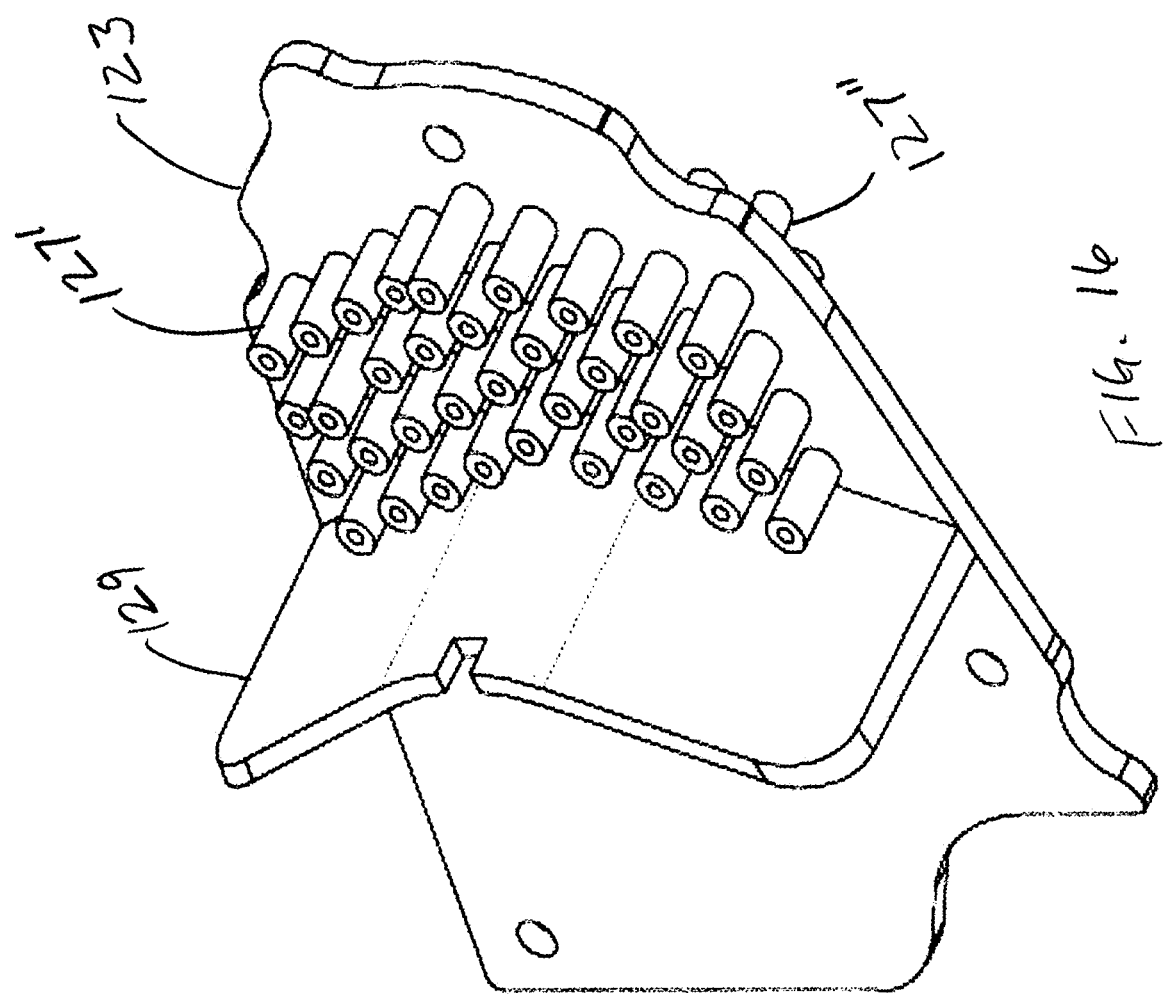

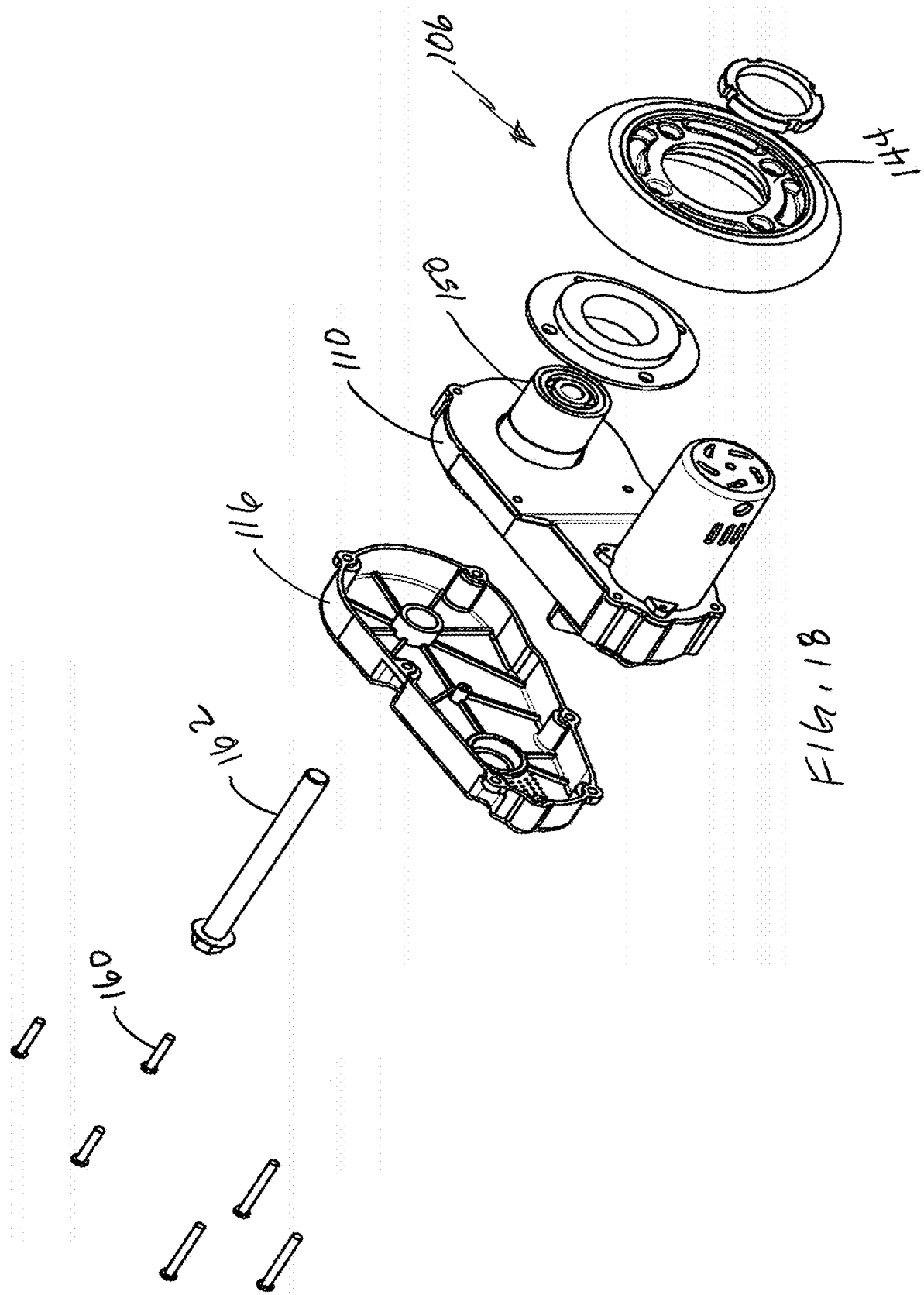

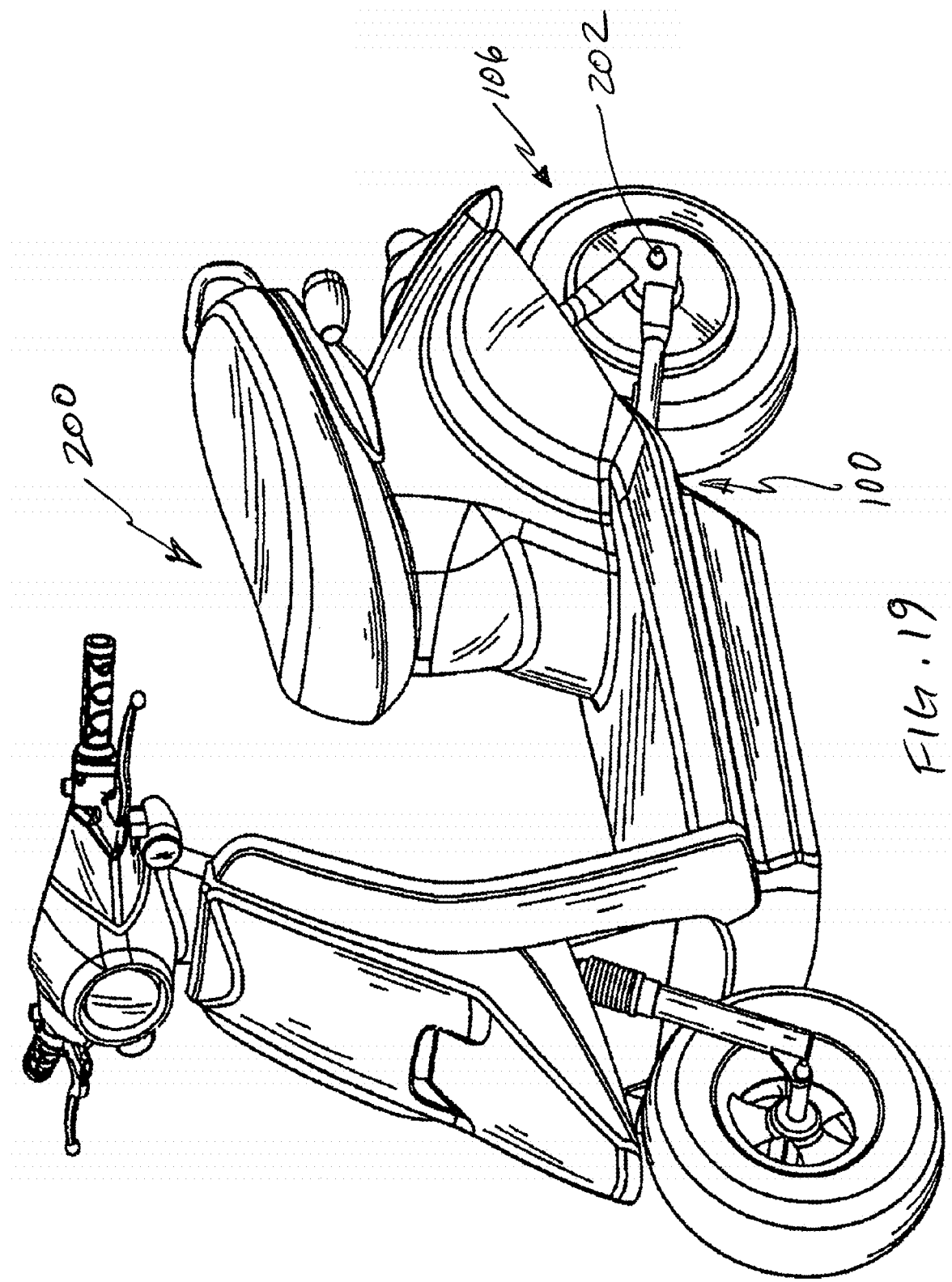

US 10,793,001 B2

TRANSMISSION AND DRIVE SYSTEM FOR AN ELECTRIC VEHICLE

CROSS-REFERENCE TO RELATED APPLICATIONS

This application is a continuation-in-part of U.S. patent application Ser. No. 16/414,066 filed May 16, 2019, which is a continuation of U.S. patent application Ser. No. 15/678,931 filed on Aug. 16, 2017 which claims priority to Chinese Patent Application No. 201620889516.0 filed on Aug. 16, 2016, the entirety of each of which is incorporated by this reference.

FIELD OF THE INVENTION

The present invention relates generally to transmissions and drive systems for electric vehicles and more specifically to a transmission having a relatively small size that is light weight and capable of efficiently improving endurance mileage and energy consumption.

BACKGROUND

At present, most transmissions applied to automobiles are relatively complex and cumbersome. When applied to an electric vehicle, particularly for an electric scooter, a transmission needs to be small, simple, practical, have a high safety factor and reliable for operation for many miles. With many prior art transmissions, when a vehicle is coasting, since the existing drive train is not provided with a unidirectional transmission, both of the drive train and power unit will rotate during the coasting, thereby resulting in a significant resistance to coasting and correspondingly a shorter coasting distance. Such existing transmissions are poor in practicality, unable to satisfy the requirements for a transmission for use in an electric vehicle such as an electric scooter.

In prior art belt drive systems, there is also a need to provide a system for maintaining a desired tension on the belt to ensure proper engagement with drive components to prevent slippage resulting from stretching or enlargement of the belt over time. That is, as belt drive systems are used, the belt can enlarge over time, either from stretching or due to wear of the inner surface of the belt causing an effective enlargement. Without an ability to maintain a proper tension on the belt, the belt can sag resulting in inefficient performance of the drive system.

Electric vehicles are known to be relatively more quiet than counterpart gas driven vehicles. Thus, there is an expectation that electric vehicles remain relatively quiet during operation. Electric drive and transmission systems, can however be relatively noisy depending on their configuration. Thus, there is a need in the art to provide noise dampening features to reduce noise that would otherwise emanate from the electric drive and transmission system.

SUMMARY OF THE INVENTION

Accordingly, the present invention provides a drive and transmission system that is relatively small in size, light weight and capable of efficiently improving endurance mileage and energy consumption. The drive and transmission system, when used with an electric vehicle also reduces coasting resistance and improves coasting distance by using a unidirectional transmission mechanism. In addition, the drive and transmission system further provides a system for maintaining a desired tension on the belt to ensure proper engagement with drive components to prevent slippage resulting from stretching or enlargement of the belt over time. Moreover, the drive and transmission system further provides noise dampening features to reduce noise that would otherwise emanate from the electric drive and transmission system.

The present invention provides a transmission with an input end connected with a driving device, an output end connected with a rear wheel, the transmission comprising a gear transmission mechanism and a pulley transmission mechanism. The gear transmission mechanism comprises a primary gear connected to the driving mechanism. The pulley transmission mechanism comprises a driving wheel, a driven wheel and a synchronous belt. The driving wheel is connected with the primary gear through a gear shaft. A unidirectional transmission mechanism is connected to the driven wheel provided in the rear wheel. The unidirectional transmission mechanism drives the rear wheel to rotate. The drive and transmission system further provides a system for maintaining a desired tension on the belt to ensure proper engagement with drive components to prevent slippage resulting from stretching or enlargement of the belt over time. Moreover, the drive and transmission system provides noise dampening features to reduce noise that would otherwise emanate from the electric drive and transmission system.

In one embodiment, the unidirectional transmission mechanism is connected with the driven wheel through a thread bushing.

In another embodiment, the rear wheel is provided with a first gear, and the periphery of the unidirectional transmission mechanism is provided with a second gear engaged with the first gear.

In yet another embodiment, the unidirectional transmission mechanism is a unidirectional flywheel or unidirectional bearing.

In still another embodiment, the rear wheel is further provided with a wheel cover plate at the side away from the driven wheel, and the wheel cover plate is fixed to the rear wheel through screws.

In yet another embodiment, the transmission further comprises a box body provided with an opening, one side of the opening being provided with a box body cover, the other side of the opening being provided with a cover plate, the box body cover, cover plate and box body constituting a closed housing, both of the gear transmission mechanism and the pulley transmission mechanism being provided in the housing.

In another embodiment, a sealing plate is provided at the connection of the box body cover and the box body, and the sealing plate is disposed over the gear shaft.

In yet another embodiment, the driving device is a motor, an output shaft of the motor is connected with the primary gear, the output shaft is used for driving the primary gear to rotate.

In still another embodiment, the tensioning system comprises a synchronous belt tension roller assembly.

In yet another embodiment, the noise dampening features comprise one or more silencing plates.

In yet another embodiment, a body fixing plate is formed by steel stamping to provide rigidity and precise placement of fastener holes.

The present invention also provides an electric vehicle comprising the transmission above.

Accordingly, the present invention provides a transmission with an input end connected with a driving device and an output end connected with a rear wheel. The transmission comprises a gear transmission mechanism and a pulley transmission mechanism. The gear transmission mechanism comprises a primary gear connected to the driving mechanism. The pulley transmission mechanism comprises a driving wheel, a driven wheel and a synchronous belt. The driving wheel is connected with the primary gear through a gear shaft. The rear wheel is provided with a unidirectional transmission mechanism connected to the driven wheel. The unidirectional transmission mechanism is used for driving the rear wheel to rotate. The transmission provided by the present invention has a relatively simple structure, occupies a relatively small space and is relatively light in weight. The transmission provides power output with the driving device, transmits power to the pulley transmission mechanism by the gear transmission mechanism. The pulley transmission mechanism drives the rear wheel to rotate through the unidirectional transmission mechanism, such that the vehicle moves forward. When the power output is stopped, due to the inertia effect of the vehicle and the small rotation resistance of the unidirectional transmission mechanism, the vehicle can smoothly coast, while the driving mechanism, gear transmission mechanism and pulley transmission mechanism are not rotating, thereby achieving the advantageous effects of saving power consumption and improving endurance mileage. A tensioning system is coupled to the synchronous belt to maintain a desired tension on the synchronous belt during use. In addition, noise dampening plates are provided that reduce vibrational noise that would otherwise emanate from the transmission, thereby providing a quieting effect to the drive and transmission system.

A body fixing plate is formed by steel stamping to provide rigidity and precise placement of fastener holes.

The drive and transmission system is reactively easy to manufacture, of relatively low cost and has significant application for vehicles, especially electric vehicles such as electric scooters.

BRIEF DESCRIPTION OF THE DRAWINGS

FIG. 10 is a perspective exploded view of the transmission and drive of FIG. 10;

FIG. 11 is a perspective exploded view of a housing and motor of the transmission and drive of FIG. 10;

FIG. 12 is a perspective view of the housing and motor of the transmission and drive of FIG. 11;

FIG. 13 is a perspective partial exploded view of the housing, motor and drive assembly of the transmission and drive of FIG. 9;

FIG. 14 is a perspective view of a belt tensioning device of the transmission and drive of FIG. 9;

FIG. 15 is a perspective view of a housing, motor and silencing plate of the transmission and drive of FIG. 9;

FIG. 16 is a perspective view of a first silencing plate of the present invention;

FIG. 18 is a perspective partial exploded view of the transmission and drive of FIG. 10; and FIG. 19 is a perspective view of a scooter with the transmission and drive of FIG. 10.

DETAILED DESCRIPTION

Figure 1:
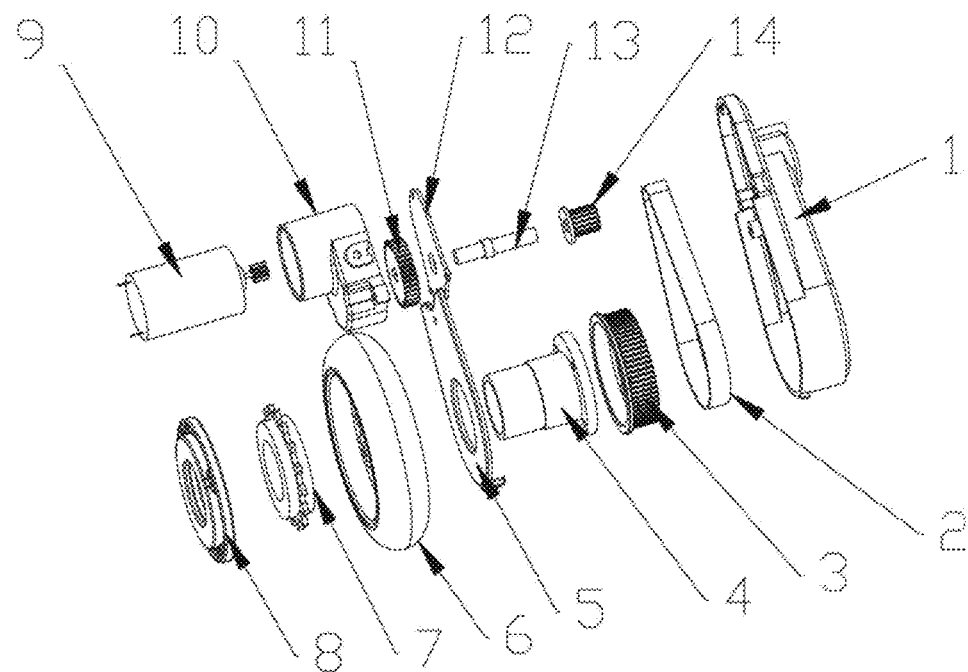
FIG. 1 is an assembly structural diagram of a transmission of a transmission embodiment of the present invention.
Figure 2:
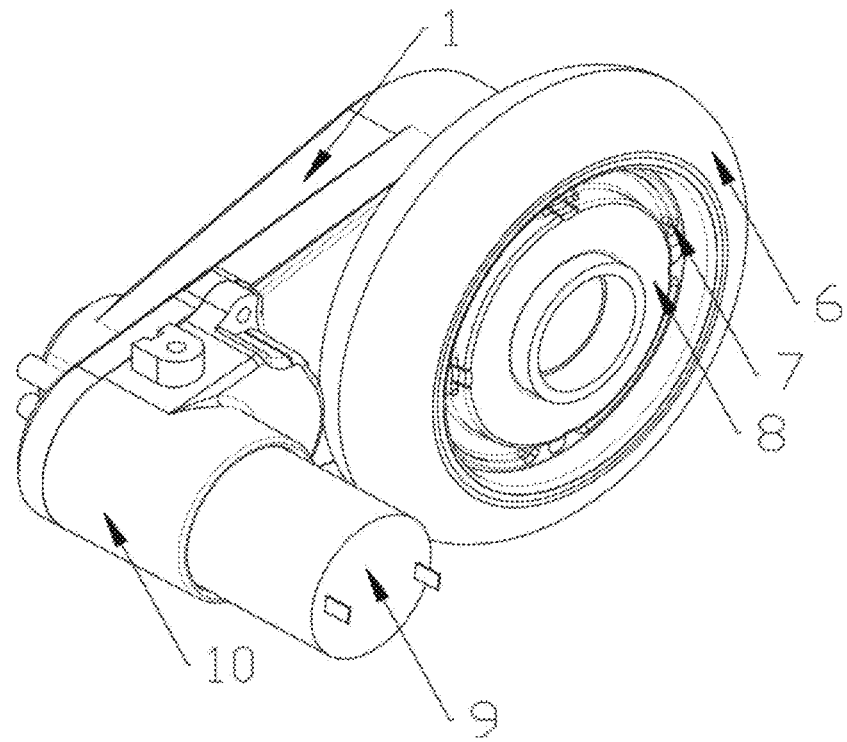
FIG. 2 is an isometric view at left front 45° of a transmission of a transmission embodiment of the present invention.
Figure 3:
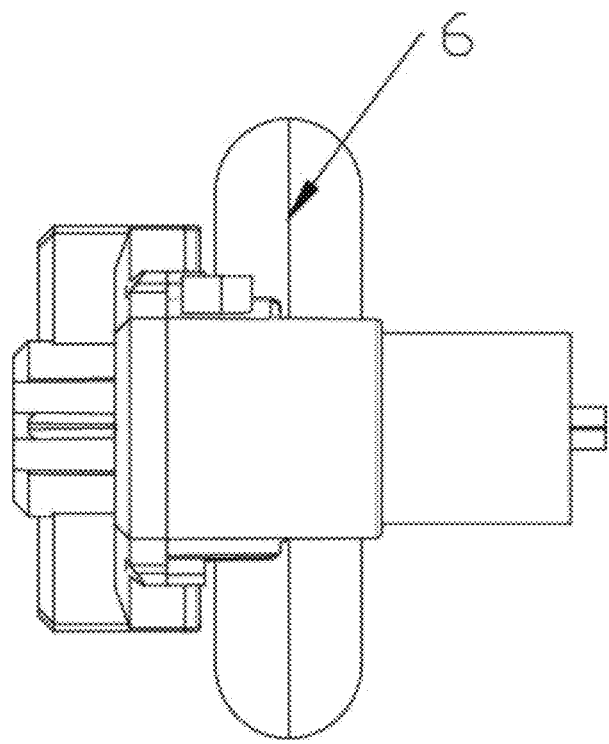
FIG. 3 is a front view of a transmission of a transmission embodiment of the present invention.
Figure 4:
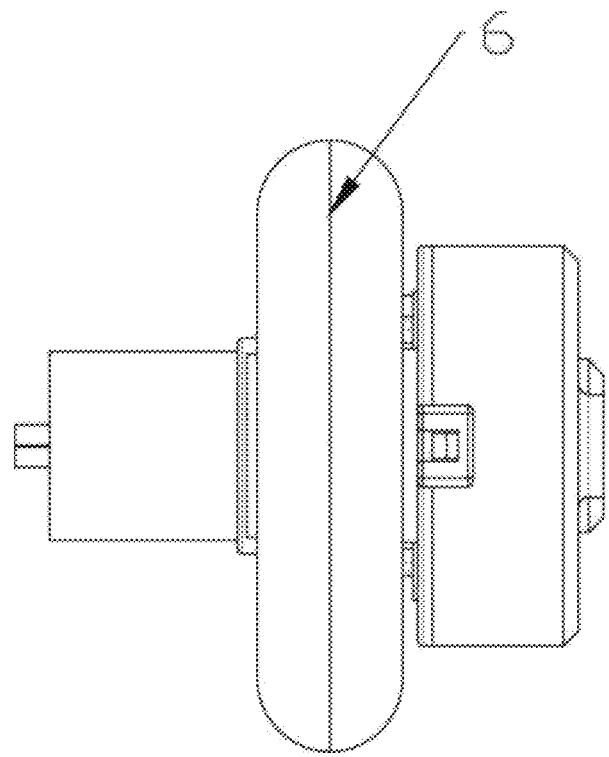
FIG. 4 is a rear view of a transmission of a transmission embodiment of the present invention.
Figure 5:
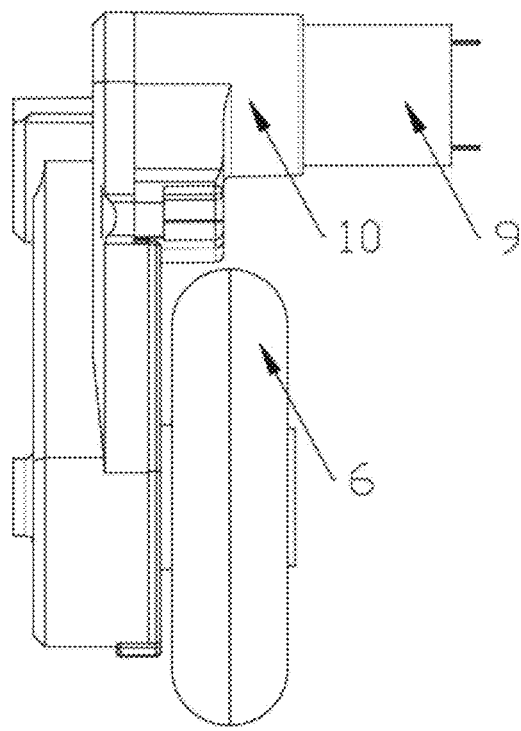
FIG. 5 is a bottom view of a transmission of a transmission embodiment of the present invention.
Figure 6:
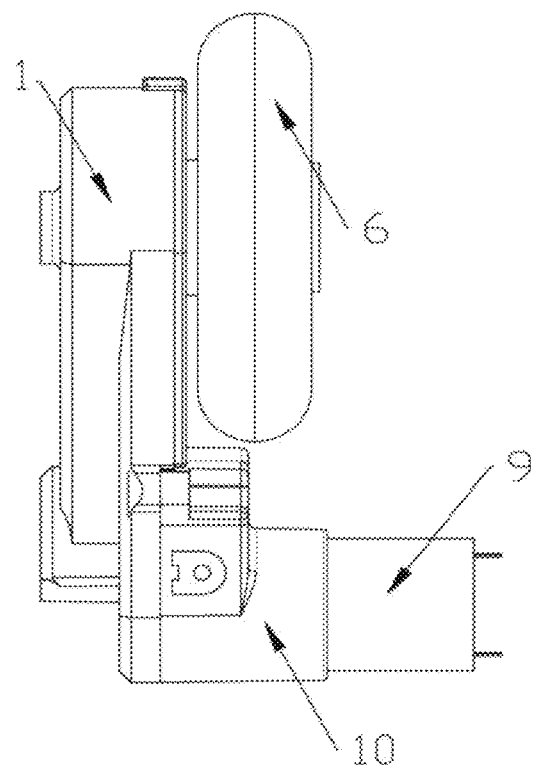
FIG. 6 is a top view of a transmission of a transmission embodiment of the present invention.
Figure 7:
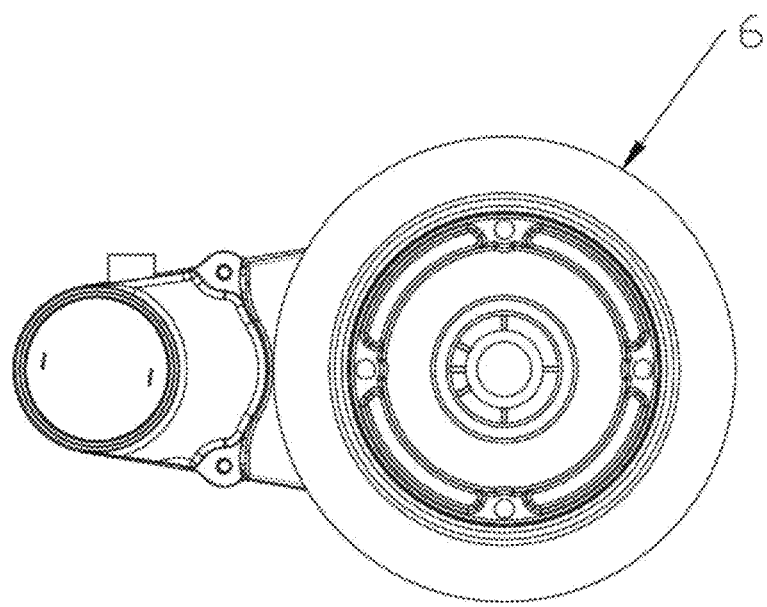
FIG. 7 is a left view of a transmission of a transmission embodiment of the present invention.
Figure 8:
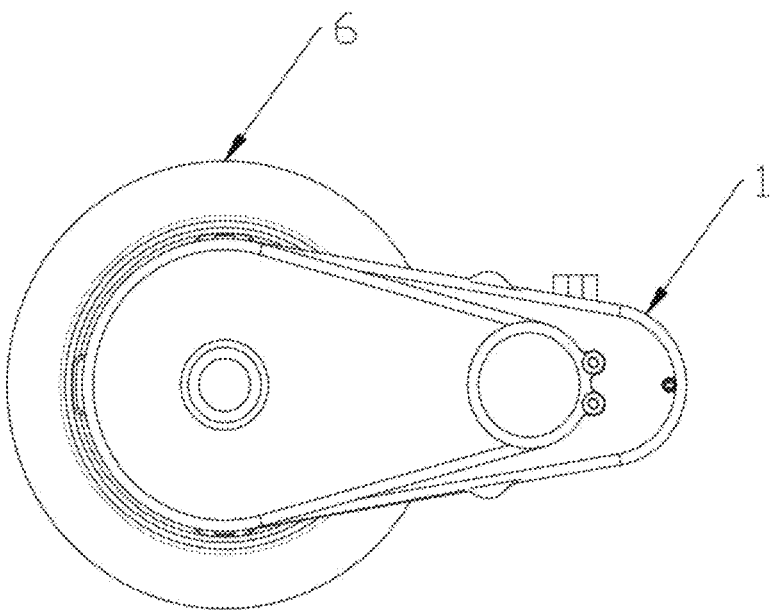
FIG. 8 is a right view of a transmission of a transmission embodiment of the present invention.

In order to make the technical solutions and advantages of the embodiments of the present invention clearer, a clear and complete description of the technical solutions in the embodiments of the present invention will be made hereinafter in combination with the drawings in the embodiments of the present invention. It is apparent that the described embodiments are not all but a part of the embodiments of the present invention. Based on the embodiments of the present invention, all other embodiments obtained by those of ordinary skills in the art without creative work are within the scope of the present invention.

As illustrated in FIGS. 1 to 8, the embodiment of the present invention provides a transmission, an input end of the transmission being connected with a driving device, the driving device providing a power source for the transmission, an output end being connected with a rear wheel 6 for driving the rear wheel 6 to rotate, such that the vehicle moves forward; the transmission specifically comprising a gear transmission mechanism and a pulley transmission mechanism, the gear transmission mechanism comprising a primary gear 11 connected to the driving mechanism, the driving mechanism driving the primary gear 11 to rotate; the pulley transmission mechanism comprising a driving wheel 14, a driven wheel 3 and a synchronous belt 2; the driving wheel 14 being connected with the primary gear 11 through a gear shaft 13, a unidirectional transmission mechanism 7 connected to the driven wheel 3 being provided in the rear wheel 6, the unidirectional transmission mechanism 7 being used for driving the rear wheel 6 to rotate. In the present embodiment, the transmission provided by the present application comprises a two-stage gearshift, wherein the power provided by the driving device is transmitted to the pulley transmission mechanism through the gear transmission mechanism, the pulley transmission mechanism transmits the power to the unidirectional transmission mechanism 7, the unidirectional transmission mechanism 7 further drives the rear wheel 6 to rotate. The transmission is with simple structure, occupies small space, and is light in weight. It efficiently solves the problem of complex and cumbersome internal structure of the existing transmission. Wherein, the driving wheel 14 is a secondary front pulley of the synchronous belt 2, and the driven wheel 3 is a secondary rear pulley of the synchronous belt 2.

Specifically, when operating, the transmission provided by the present application provides power output by the driving device, transmits the power to the pulley transmission mechanism by the gear transmission mechanism, and the pulley transmission mechanism drives the rear wheel 6 to rotate through the unidirectional transmission mechanism 7, such that the vehicle moves forward; when the power output is stopped, due to the inertia effect of the vehicle and the relatively small rotation resistance of the unidirectional transmission mechanism 7, the vehicle can smoothly coast, while the driving mechanism, gear transmission mechanism and pulley transmission mechanism are not rotating, thereby achieving the advantageous effects of saving power consumption and improving endurance mileage.

Specifically, the unidirectional transmission mechanism 7 is connected with the driven wheel 3 by a thread bushing 4. In the present embodiment, the inner sides of the unidirectional transmission mechanism 7 and the driven wheel 3 are both provided with inner threads matching the thread bushing 4. This coupling method is of good transmission effect, and is simple in process, being capable of improving the installation efficiency of the transmission and is also easy for maintenance and overhaul.

A first gear is provided in the rear wheel 6, and the periphery of the unidirectional transmission mechanism 7 is provided with a second gear engaged with the first gear, so as to complete the power transmission from the unidirectional transmission mechanism 7 to the rear wheel 6. It is of reliable operation and wide rotation speed range by employing the method of gear engaging, which is conducive to ensuring the normal operation of the transmission. Meanwhile, it is of light weight and small size, is simple in manufacturing process and low in production costs. It is helpful for improving economy, suitable for electric scooters with small costs.

The unidirectional transmission mechanism 7 is a unidirectional flywheel or unidirectional bearing. A ratchet is provided in the unidirectional flywheel, through the ratchet a unidirectional rotation transmission is achieved; the unidirectional bearing is a bearing that can freely rotate in one direction and locked in the other direction. It is of small resistance by providing the unidirectional flywheel or the unidirectional bearing, so that the vehicle can smoothly coast; particularly for a small electric scooter, it can be ridden or driven in the form of one foot thrusting against the ground as a non-powered scooter, when the vehicle battery runs out of power.

Further, in order to avoid exposing the unidirectional transmission mechanism 7 and to improve aesthetics, the rear wheel 6 is further provided with a wheel cover plate 8 at the side away from the driven wheel 3, and the wheel cover plate 8 is fixed to the rear wheel 6 through screws. Particularly, in addition to the fixing method by using screws, the wheel cover plate 8 and the rear wheel 6 can also use other fixing connection methods such as engaging, embedding or clamping.

Further, in order to prevent debris from going into the transmission mechanism transmission affecting the usage, and concerning the aesthetics, the transmission further comprises a box body 1 provided with an opening, one side of the opening being provided with a box body cover 10, the other side of the opening being provided with a cover plate 5, the box body cover 10, cover plate 5 and box body 1 constituting a closed housing, both of the gear transmission mechanism and the pulley transmission mechanism being provided in the housing. Wherein, the cover plate 5 is provided at the connection of the rear wheel 6 and the box body 1.

Further, a sealing plate 12 is provided at the connection of the box body cover 10 and the box body 1, and the sealing plate 12 is disposed over the gear shaft.

In the present embodiment, the contour shape of the sealing plate 12 matches the contour shape of the opening of the box body 1. It avoids the overflow of the lubricating oil on the primary gear 11, which affects the normal use of the transmission, by providing the sealing plate 12.

The driving device is a motor 9, an output shaft of the motor 9 is connected with the primary gear 11. The output shaft is used for driving the primary gear 11 to rotate. In the present embodiment, the motor 9 is a 12V high-rotation-speed micro-motor 9. Different from the conventional 6812-type motor 9, it is of lighter weight, lower cost and better economy. Particularly, in addition to the motor 9, the driving device can also be other power sources such as battery, solar or hydraulic or other power sources.

Figure 9:
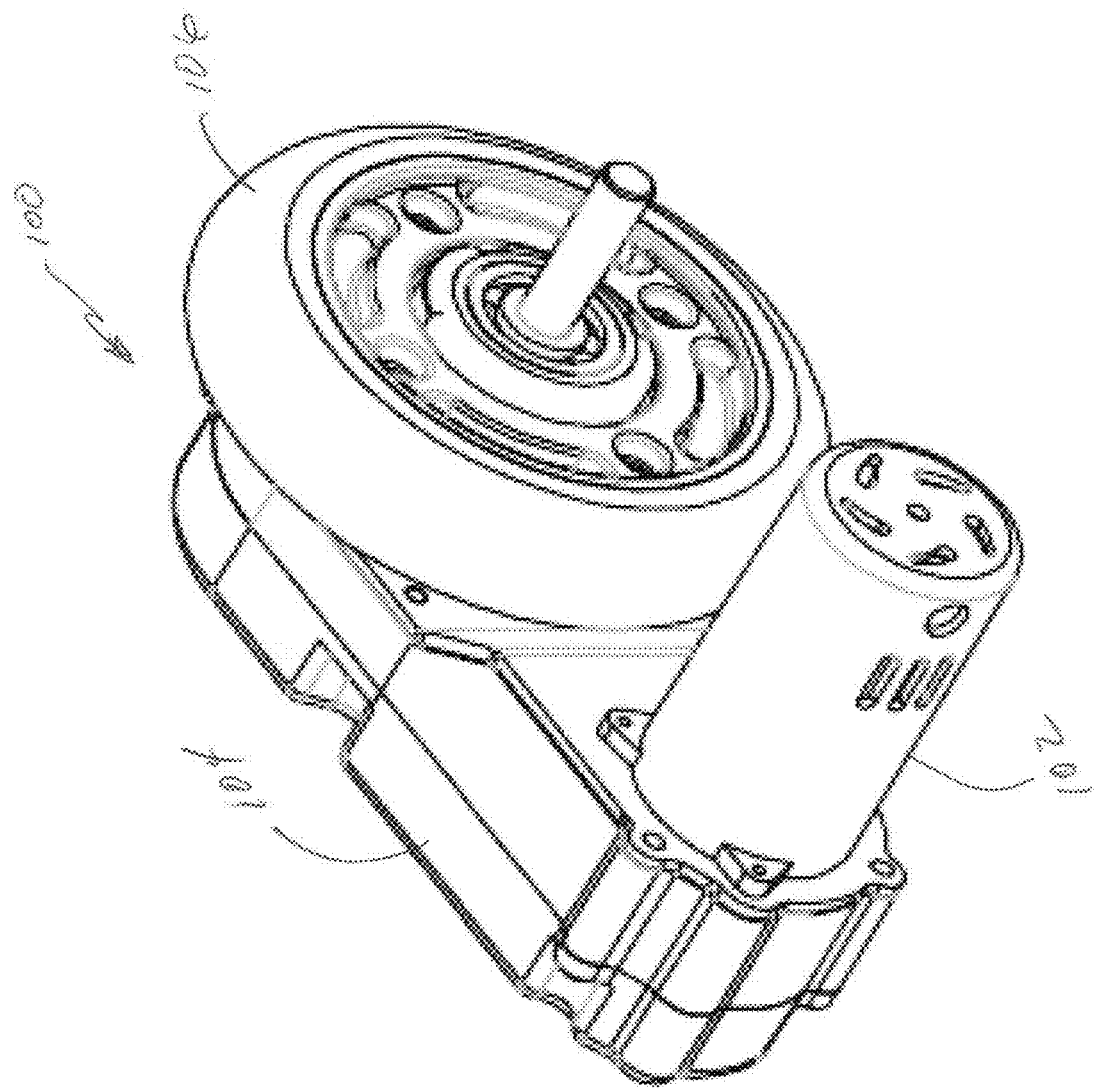
FIG. 9 is a perspective view of an embodiment of a transmission and drive of the present invention.

FIGS. 9-18 illustrate another embodiment of a drive and transmission system 100 according to the present invention. As shown in FIG. 9, the drive and transmission system 100 comprises a motor assembly 102 coupled to an input side of transmission assembly 104. A wheel assembly 106 is coupled to an output side of the transmission assembly 104. By positioning the wheel 106 on the same side of the transmission assembly 104 as the motor assembly 102, the drive and transmission system 100 is relatively compact.

As shown in FIG. 10, the motor assembly 102 is comprised of an electric motor 108 that is coupled to a left transmission housing 110 and transmission housing reinforcement plate 112 via the motor housing 114. That is, the motor housing 114 is placed over the motor 108 and secured to the transmission housing 110 with fasteners and with the reinforcement plate 112 interposed between the motor housing 114 and the left transmission housing 110.

The transmission assembly 104 is comprised of the left transmission housing 110 and the right transmission housing 116, within which the various transmission components are coupled and housed. The transmission assembly 104 is comprised of a drive gear 118 that is driven by the output shaft gear 109 of the electric motor 108. The drive gear 118 is coupled to a drive pulley 120 with a gear shaft 122. The gear shaft 122 is coupled to the left and right transmission housings with bearings 124 and 126 that allow free rotation of the gear shaft 122 relative to the left and right transmission housings. The drive gear 118 and drive pulley 120 are fixedly attached to the gear shaft such that rotation of the drive gear by the motor's output shaft gear 109 causes corresponding rotation of the drive pulley 120.

A sealed silencing plate 123 is coupled between the drive pulley 118 and the right transmission housing 116. The sealed silencing plate extends over the area of engagement between the drive pulley 118 and the output shaft gear 109 of the motor 108. The sealed silencing plate 123 includes a plurality of protrusions that extend toward the drive pulley 118 and the output shaft gear 109 and are configured to dampen any vibrational noise that may emanate from this gear interaction. Additionally, another silencing plate 125 is positioned between the first silencing plate 123 and the right transmission housing 116. The second silencing plate 125 also includes a plurality of projections that extend toward the first silencing plate 123 and provide additional noise dampening. In combination, the first and second silencing plates 123 and 125 in a stacked arrangement significantly reduce the sound level of the transmission assembly 104 during operation.

The drive pulley 120 is coupled to and drives a timing belt 128. The timing belt is coupled at its opposite side to a driven pulley 130. The driven pulley 130 is attached to a threaded bushing 132. The driven pulley 130 is supported relative to the right transmission housing 116 with axel 134, axel bushings 135 and 137 and bearing 136 that allow free rotation of the driven pulley 130 relative to the right housing 116 as controlled by the movement of the timing belt 128.

A belt tensioning assembly 140 is coupled to the left transmission housing 110 and applies tension to the timing belt 128 to maintain consistent tension in the belt as the belt wears or stretches over time. The belt tensioning assembly 140 thus ensures consistent and reliable belt tension of the timing belt 128 over time. As a result, the life expectancy of the timing belt is significantly increased and thus will require less frequent replacement during the life of the transmission assembly 104.

The threaded bushing 132 extends through the left transmission housing and is coupled to the wheel assembly 106. The wheel assembly 106 is comprised of a rubber outer tire 142 and rim 144, a cover plate 146, to which one way bearing clutch 150 and dust cover 152. The one way bearing clutch 150 is attached at its outer perimeter to the inside of the threaded bushing such that rotation of the threaded bushing by the driven pulley 130 causes rotation of the tire 142 in a forward direction. When the driven pulley 130 stops rotation or is rotating at a slower rotational speed than the tire 144 is rotating, the one way bearing clutch 150 allows the tire 144 to freely rotate, such as when coasting.

As shown in FIG. 11, the transmission housing reinforcement plate 112 has a similar contour as the face 111 of the left transmission housing 110. That is, the transmission housing reinforcement plate 112 has a first planar portion 113 separated from a second planar portion 115 by an angled portion 117 such that the first planar portion 113 and second planar portion 115 are parallel to one another but lie in different planes. The transmission housing reinforcement plate 112 is formed from stamped metal, such as steel, so that the apertures and bolt holes are precisely positioned to overlay and mate with the left transmission housing 110. The transmission housing reinforcement plate 112 is secured to the left transmission housing 110 with a plurality of threaded fasteners that extend through the various bolt holes that align with similar bolt holes in the left transmission housing 110. The transmission housing reinforcement plate 112 adds substantial strength to the left transmission housing 110 without adding significant weight to the transmission. That is, the transmission housing reinforcement plate 112 prevents the left transmission housing 110 from flexing or warping during use.

As shown in FIG. 12, when assembled, the output shaft gear 109 of the electric motor 108 extends through respective holes in the transmission housing reinforcement plate 112 and the left transmission housing 110 to engage with the drive pulley 118 (see FIG. 10) on the inside of the left transmission housing 110. In addition, the transmission housing reinforcement plate 112 abuts against the face of the left transmission housing 110. The transmission housing reinforcement plate 112 prevents deformation of the left transmission housing 110.

Referring now to FIG. 13, the drive components include the motor housed within the motor housing 114 that is attached to the left transmission housing 110 and the timing belt and associated pulleys 120 and 130. The driving pulley 120 and driven pulley 130 are rotatably fixed relative to the left transmission housing 110 such that their relative spacing from one another remains constant during the life of the transmission. That is, the driving pulley 120 is rotatably fixed to the left transmission housing so as to engage with and be rotated by the output shaft gear 109 of the motor 108 (not visible). Likewise, the driven pulley 130 is rotatably fixed to the left transmission housing with the threaded bushing 132 that is attached at one end to the driven pulley 130 and extends through the associated apertures of the left transmission housing and reinforcing plate 112.

In order to maintain a consistent tension on the timing belt 128, a belt tensioning assembly 140 is coupled to the left transmission housing 110 and applies tension to the timing belt 128 to maintain consistent tension in the belt as the belt wears or stretches over time. The belt tensioning assembly 140 ensures consistent and reliable belt tension of the timing belt 128 over time. As a result, the life expectancy of the timing belt is significantly increased and thus will require less frequent replacement during the life of the transmission assembly 104.

As shown in FIG. 14, the belt tensioning assembly 140 is comprised of an elongate plate 141 having a mounting portion 143 with a threaded fastener 145 for mounting the elongate plate 141 relative to the left transmission housing 110. The mounting potion 143 and thus the elongate plate 141 can freely pivot about the threaded fastener 145 but is restrained from pivoting by the biasing member 147. The biasing member 147 comprises a spring that is coupled at one end relative to the left transmission housing 110 and applies a biasing force at an opposite end to the elongate plate 141. The biasing member 147 may be comprised of spring steel. At the opposite end of the elongate plate 141 is mounted an idle roller 149, essentially in the form of a spool with side walls spaced apart a distance to be approximately equal to or only slightly wider than a width of the timing belt 128. The idle roller 149 can freely rotate relative to the elongate plate 141. When mounted, the idle roller 149 is positioned against an outer surface of the timing belt 128 and as a result of the spring force of the biasing member 147 applies constant pressure against the timing belt 128 so as to maintain consistent tension on the timing belt 128 and to keep the teeth-groove engagement between the inner teeth of the timing belt with the outer teeth of the driving pulley so as to prevent slippage. The idle roller 149 is positioned against the outer surface of the timing belt at a position between the driving pulley and the driven pulley.

Referring now to FIG. 15, the first sealing silencing plate 123 and second silencing plate 125 are coupled to the left transmission housing 110. The first and second silencing plates 123 and 125 extend over the area of engagement between the drive pulley and the output shaft gear (not visible). The first and second silencing plates 123 and 125 work in concert to reduce noise that would otherwise emanate from the transmission.

As shown in FIG. 16, the sealed silencing plate 123 includes a plurality of protrusions 127' and 127" on both sides of the silencing plate 123. The protrusions 127' and 127" are each comprised of hollow cylinders that extend from the surfaces of the silencing plate 123. The positioning and configuration of the protrusions effectively absorb vibrational noise emanating from the intermeshing gears over which the silencing plate 123 is positioned. The sealed silencing plate 123 has an outer contour that is configured to precisely match an inner contour of the left transmission housing 110 so that sound cannot pass between the sealed silencing plate 123 and the inner surface of the left transmission housing 110, thus being effectively sealed about its perimeter to the inner surface of the left transmission housing 110. The sealed silencing plate 123 also includes a sealing wall 129 that extends at a 90 degree angle to the plate 123 and is integrally formed and depends therefrom. The sealing wall 129 is configured to mate with the right transmission housing 116 and to define a sound chamber within which the second silencing plate 125 is positioned.

Figure 17B:
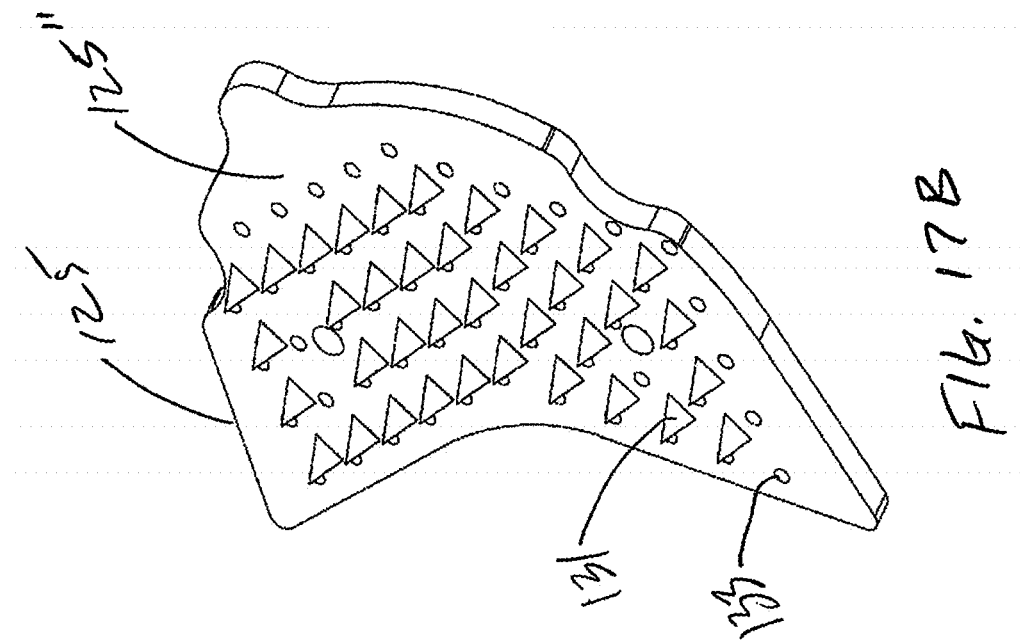
FIGS. 17a and 17b are side and perspective views, respectively, of a second silencing plate of the present invention.
Figure 17A:
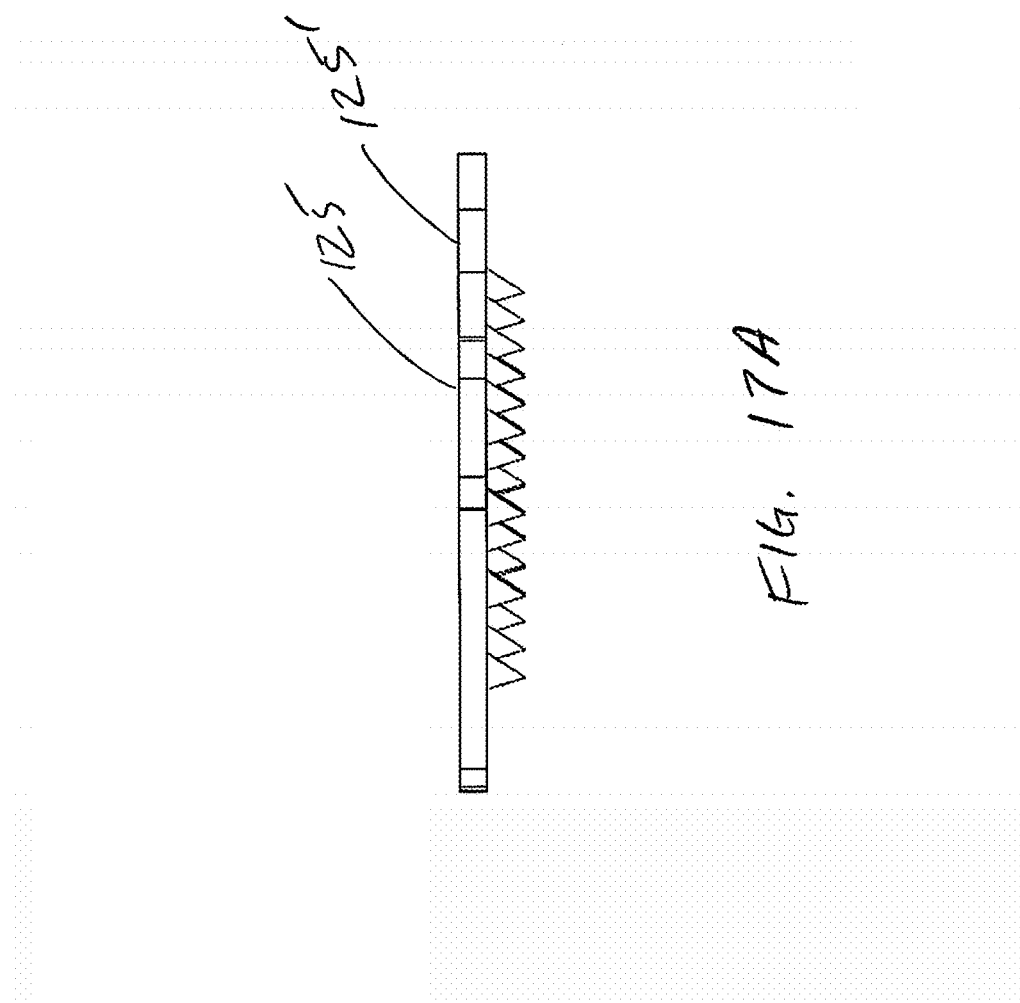

As shown in FIGS. 17A and 17B, the second silencing plate 125 has a first side 125' that is generally planar and a second planar side 125" that includes a plurality of triangular shaped protrusions 131 and a plurality of holes 133. The positioning and configuration of the triangular shaped protrusions 131 further effectively absorb vibrational noise emanating from the intermeshing gears over which the second silencing plate 125 is positioned. The first sealing silencing plate 123 and second silencing plate 125 are plastic parts made by injection molding so as to be relatively inexpensive to manufacture and to provide good sound deadening characteristics. Thus, the first sealing silencing plate 123 and second silencing plate 125 reduce the noise when the transmission is operating.

Referring now to FIG. 18, to assembly the drive and transmission system 100, the left transmission housing 110 and right transmission housing 116 are mated together and secured with a plurality of screws 160. An elongate bolt 162 provides an axel for the wheel 106 and extends through the left and right transmission housings 110 and 116, through the one way clutch, and rim 144.

Finally, as shown in FIG. 19, the drive and transmission system 100 may be utilized in an electric scooter 200 with the wheel assembly 106 being driven by the drive and transmission system 100 and the axel bolt 162 attached to the frame 202 of the electric scooter 200.

Thus, the present invention also provides an electric vehicle, such as electric scooter 200, comprising the drive and transmission system 100 of the present invention. The drive and transmission system 100 consumes low power, is capable of efficiently improving the endurance mileage of the electric vehicle, significantly enhancing the demands for transportation of the consumers, by using the transmission with the structure above. It should be noted that due to the light weight and small size, the transmission provided by the present application is particularly suitable for electric scooters with two wheels, three wheels and four wheels. In addition to the descriptions above, the transmission above can also be suitable for ordinary vehicles, achieving the advantageous effect of reducing power consumption.

In summary, the present invention provides a transmission, with an input end connected with a driving device, an output end connected with a rear wheel, comprising a gear transmission mechanism and a pulley transmission mechanism, the gear transmission mechanism comprising a primary gear connected to the driving mechanism; the pulley transmission mechanism comprising a driving wheel, a driven wheel and a synchronous belt; the driving wheel being connected with the primary gear through a gear shaft, a unidirectional transmission mechanism connected to the driven wheel being provided in the rear wheel, the unidirectional transmission mechanism being used for driving the rear wheel to rotate. The transmission provided by the present application is with simple structure, small footprint and light weight; and provides power output by the driving device, transmits power to the pulley transmission mechanism by the gear transmission mechanism. The pulley transmission mechanism drives the rear wheel to rotate through the unidirectional transmission mechanism, such that the vehicle moves forward; when the power output is stopped, due to the inertia effect of the vehicle and the small rotation resistance of the unidirectional transmission mechanism, the vehicle can smoothly coast while the driving mechanism, gear transmission mechanism and pulley transmission mechanism are not rotating, thereby achieving the advantageous effects of saving power consumption and improving endurance mileage. The transmission is of strong practicability, is beneficial to the standardized production and promotion.

It should be noted that the embodiments above are only used to illustrate the technical solutions of the present invention, and are not intended to be limiting thereto; although the present invention has been described in detail with reference to the foregoing embodiments, it should be understood by those of ordinary skill in the art that the technical solutions described in the foregoing embodiments may be modified, combined or equivalently replaced with some of the technical features; while these modifications, combinations or substitutions do not make the essence of the corresponding technical solutions to depart from the spirit and scope of the technical solutions of each embodiment of the present invention.

What is claimed is:

1. A transmission and drive system, comprising:
   an electric motor having an output shaft;
   a shaft gear attached to the output shaft of the electric motor;
   a primary gear engaging the shaft gear such that rotation of the shaft gear causes rotation of the primary gear;
   a driving pulley attached to the primary gear with a gear shaft, the primary gear driving the gear shaft and in turn driving the driving pulley;
   a driven pulley coupled to the driving pulley with a timing belt, the driving pulley driving the timing belt and in turn driving the driven pulley;
   a one way clutch attached to the driven pulley such that rotation of the driven pulley in a forward direction causes a corresponding forward rotation of the one way clutch;
   a rear wheel coupled to the one way clutch such that rotation of the one way clutch in a forward direction by the driven pulley causes a corresponding forward rotation of the rear wheel, so that the one way clutch drives the rear wheel in the forward direction when caused to rotate by the driven pulley and to allow the rear wheel to freely rotate relative to the driven pulley when the driven wheel is not rotating;
   a tensioning device coupled to the timing belt to apply a biasing tension to the timing belt; and
   a housing comprised of a left side housing and a right side housing, the left side housing and right side housing attached to one another to form an enclosed housing wherein the driven pulley, timing belt and driving pulley are disposed within the housing.

2. The transmission and drive system of claim 1, wherein the one way clutch is coupled to the driven wheel with a thread bushing.

3. The transmission and drive system of claim 2, wherein a periphery of the one way clutch comprises a gear.

4. The transmission and drive system of claim 1, wherein the one way clutch is a unidirectional bearing.

5. The transmission and drive system of claim 1, wherein the rear wheel further comprises a wheel cover plate at a side away from the driven wheel, and wherein the wheel cover plate is fixed to the rear wheel and covers the unidirectional transmission mechanism.

6. The transmission and drive system of claim 1, wherein the tensioning device comprises a mounting plate pivotally coupled proximate a first end to the housing, a biasing device configured to apply a bias to the mounting plate and an idle roller coupled proximate a second end of the mounting plate, the idle roller engaging with the timing belt to apply the tensioning bias to the timing belt.

7. The transmission and drive system of claim 6, wherein the idle roller is positioned against an outer surface of the timing belt at a position between the driving pulley and the driven pulley.

8. The transmission and drive system of claim 7, wherein the idle roller is in the form of a spool having sides extending above a surface of the idle roller to maintain the idle roller relative to the timing belt.

9. The transmission and drive system of claim 1, further comprising at least one silencing plate positioned over the shaft gear and primary gear to reduce noise emanating therefrom.

10. The transmission and drive system of claim 9, wherein the at least one silencing plate comprises a first silencing plate having a first plurality of protrusions extending from a first side of the first silencing plate.

11. The transmission and drive system of claim 10, wherein the at least one silencing plate comprises a second silencing plate having a second plurality of protrusions extending from a first side of the second silencing plate and a third plurality of protrusions extending from a second side of the second silencing plate, the first and second silencing plates positioned in a stacked arrangement.

12. A transmission and drive system, comprising:
an electric motor having an output shaft;
a shaft gear attached to the output shaft of the electric motor;
a primary gear engaging the shaft gear such that rotation of the shaft gear causes rotation of the primary gear;
a driving pulley attached to the primary gear with a gear shaft, the primary gear driving the gear shaft and in turn driving the driving pulley;
a driven pulley coupled to the driving pulley with a timing belt, the driving pulley driving the timing belt and in turn driving the driven pulley;
a one way clutch attached to the driven pulley such that rotation of the driven pulley in a forward direction causes a corresponding forward rotation of the one way clutch;
a rear wheel coupled to the one way clutch such that rotation of the one way clutch in a forward direction by the driven pulley causes a corresponding forward rotation of the rear wheel, so that the one way clutch drives the rear wheel in the forward direction when caused to rotate by the driven pulley and to allow the rear wheel to freely rotate relative to the driven pulley when the driven wheel is not rotating;
at least one silencing plate positioned over the shaft gear and primary gear to reduce noise emanating therefrom; and
a housing comprised of a left side housing and a right side housing, the left side housing and right side housing attached to one another to form an enclosed housing wherein the driven pulley, timing belt and driving pulley are disposed within the housing.

13. The transmission and drive system of claim 12, wherein the one way clutch is coupled to the driven wheel with a thread bushing.

14. The transmission and drive system of claim 13, wherein a periphery of the one way clutch comprises a gear.

15. The transmission and drive system of claim 12, wherein the one way clutch is a unidirectional bearing.

16. The transmission and drive system of claim 12, wherein the rear wheel further comprises a wheel cover plate at a side away from the driven wheel, and wherein the wheel cover plate is fixed to the rear wheel and covers the unidirectional transmission mechanism.

17. The transmission and drive system of claim 12, further comprising a tensioning device coupled to the timing belt to apply a biasing tension to the timing belt, the tensioning device comprises a mounting plate pivotally coupled proximate a first end to the housing, a biasing device configured to apply a bias to the mounting plate and an idle roller coupled proximate a second end of the mounting plate, the idle roller engaging with the timing belt to apply the tensioning bias to the timing belt.

18. The transmission and drive system of claim 17, wherein the idle roller is positioned against an outer surface of the timing belt at a position between the driving pulley and the driven pulley.

19. The transmission and drive system of claim 12, wherein the at least one silencing plate comprises a first silencing plate having a first plurality of protrusions extending from a first side of the first silencing plate.

20. The transmission and drive system of claim 19, wherein the at least one silencing plate comprises a second silencing plate having a second plurality of protrusions extending from a first side of the second silencing plate and a third plurality of protrusions extending from a second side of the second silencing plate, the first and second silencing plates positioned in a stacked arrangement.

* * * * *